United States Patent [19]

Grey et al.

[11] Patent Number: 5,121,644
[45] Date of Patent: Jun. 16, 1992

[54] DEPLOYING CABLES IN PIPELINES

[75] Inventors: Alan C. Grey, Newport Gwent; John L. Stokes, Abergavenny Gwent, both of United Kingdom

[73] Assignee: STC PLC, London, England

[21] Appl. No.: 654,751

[22] Filed: Feb. 13, 1991

[30] Foreign Application Priority Data

Feb. 14, 1990 [GB] United Kingdom ............ 9003343

[51] Int. Cl.⁵ ............................................ B65H 59/00
[52] U.S. Cl. .................................... 73/865.9; 254/134.4
[58] Field of Search ............ 73/865.8, 866.5, 862.39, 73/862.44, 40.5 P, 865.9; 254/134.3 FT, 134.3 SC, 134.4

[56] References Cited

U.S. PATENT DOCUMENTS

| 1,208,065 | 12/1916 | Williams | 73/862.44 |
|---|---|---|---|
| 4,458,880 | 7/1984 | Coati | 73/862.44 |
| 4,495,808 | 1/1985 | Fischer, III | 73/866.5 |
| 4,822,005 | 4/1989 | Aleshire | 254/134.4 |
| 4,856,937 | 8/1989 | Grocott et al. | 254/134.4 |
| 4,939,939 | 7/1990 | Vemmer | 73/862.44 |
| 4,953,828 | 9/1990 | Baldecchi et al. | 254/134.4 |

FOREIGN PATENT DOCUMENTS

| 2614698 | 11/1988 | France | 73/862.39 |
|---|---|---|---|
| 2171218 | 8/1986 | United Kingdom . | |

Primary Examiner—Hezron E. Williams
Assistant Examiner—Howard Wisnia
Attorney, Agent, or Firm—Lee, Mann, Smith, McWilliams, Sweeney & Ohlson

[57] ABSTRACT

Cable deployment in a fluid filled pipeline under pressure is monitored by use of a strain gauge device coupled between the leading end of the cable and a drogue. The strain gauge measures the pull of the drogue on the leading end of the cable and the strain gauge signal is transmitted back to the other end of the cable via the cable conductors. Changes in fluid flow rate, features of the pipeline, and failure of the drogue to inflate can be detected quickly by monitoring the strain gauge signal, so that the cable feed rate can be changed accordingly in order to maintain satisfactory deployment.

7 Claims, 3 Drawing Sheets

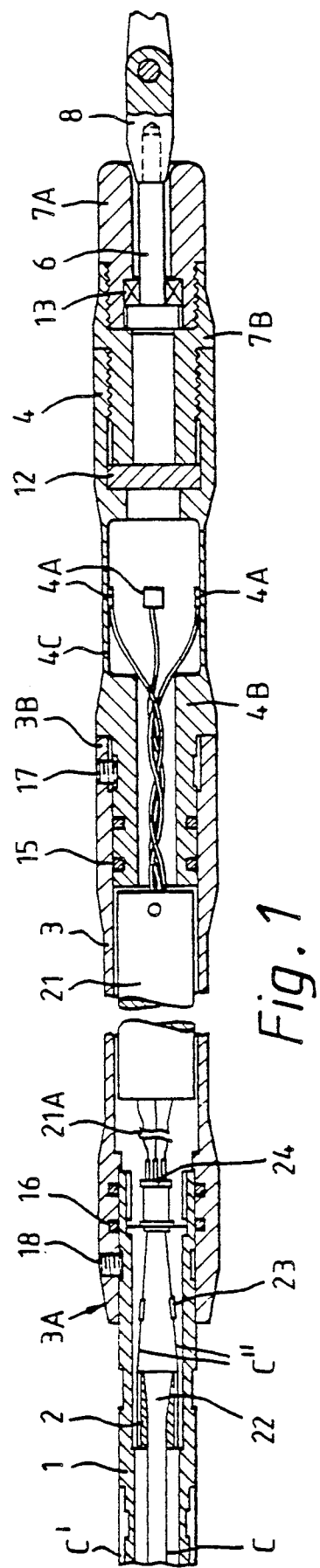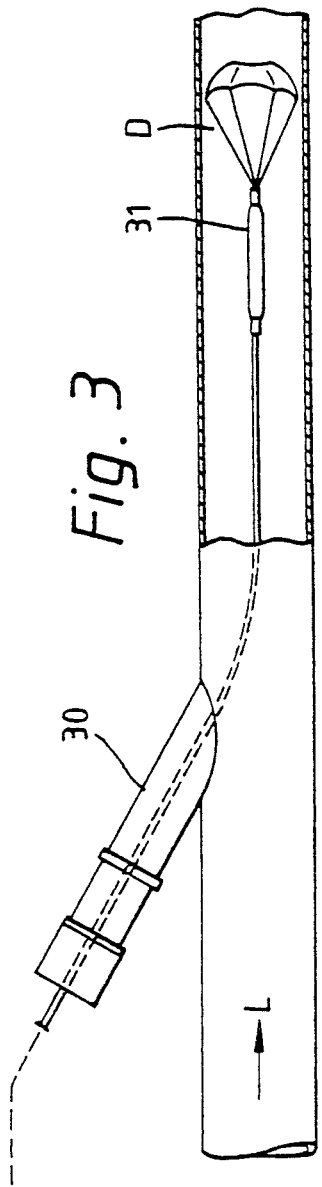

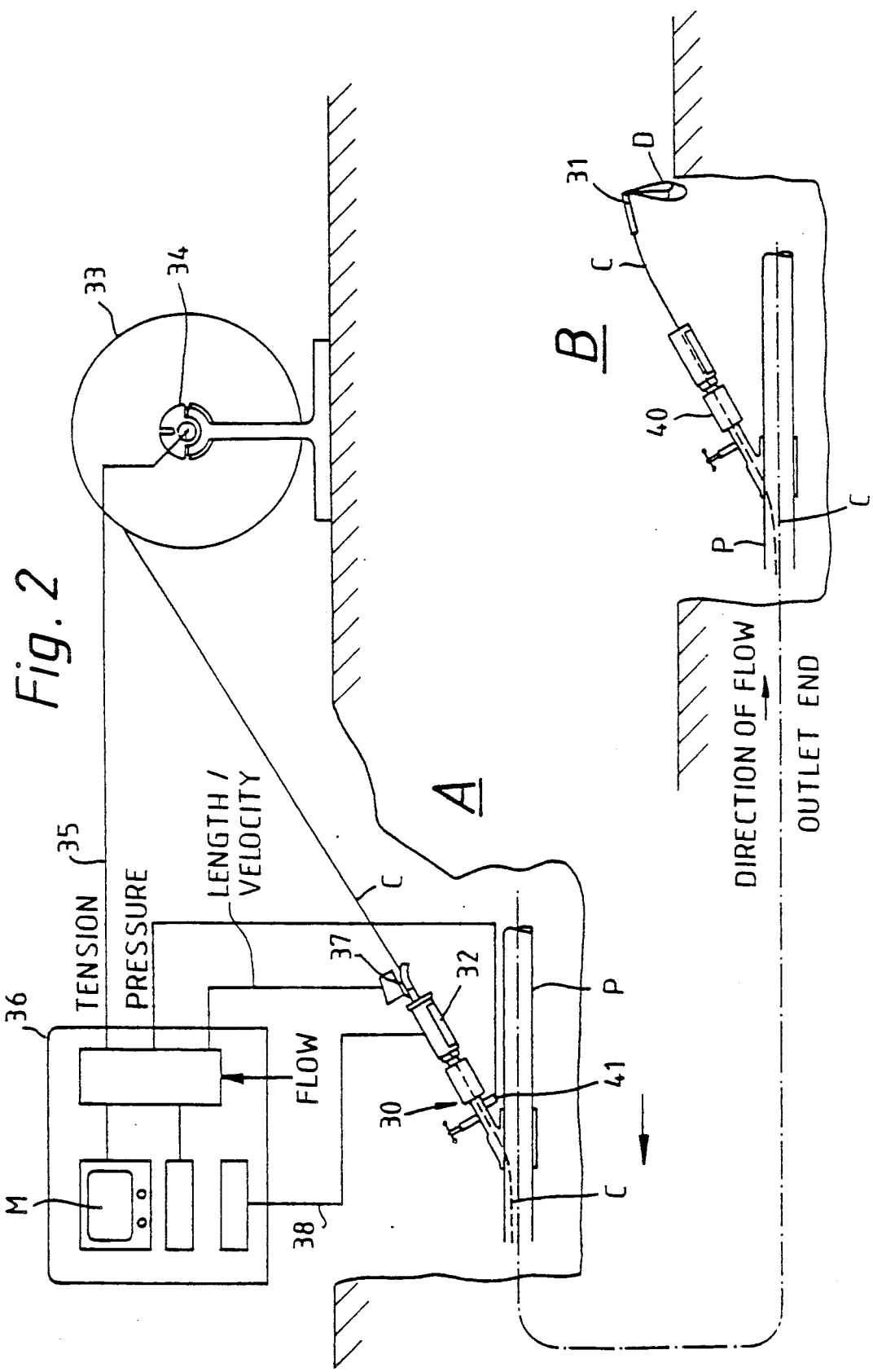

DEPLOYING CABLES IN PIPELINES

This invention relates to deploying cables in pipelines utilising the drag of a liquid flowing in the pipeline.

BACKGROUND OF THE INVENTION

Our British Patent 2171218B discloses and claims the idea of deploying a cable in a pipeline using the drag of a flowing liquid. A near neutrally buoyant cable is deployed into the pressurised fluid-filled pipeline which has flow. Drag due to friction of the fluid over the cable allows deployment of the cable over long distances for example 2-10 kilometers. A drogue is employed at the end of the cable, its function being to guide and provide extra pulling force created by the additional drag of the fluid on the drogue. The cable is deployed at less than the flow rate in the pipe in order to maintain sufficient drag to overcome friction due to cable touching the pipe wall and capstan effects around bends in the pipe, gravitational effects and pressure difference forces.

As the cable is being deployed it is not always easy to determine if deployment is proceeding satisfactorily; for example there may be an obstruction in the pipeline, the drogue may become snagged on the pipeline wall where it is perhaps corroded, the drogue may not inflate properly after insertion through the side wall entry valve or the liquid flow rate may change or even cease altogether.

If any of these problems arise during deployment they may prevent satisfactory deployment and/or damage the cable if remedial steps are not quickly taken.

It is an object of the present invention to monitor the deployment of a cable and to enable problems such as those described above to be quickly determined.

SUMMARY OF THE INVENTION

According to the present invention there is provided a method of deploying a cable in a pipeline utilising the drag of a fluid flowing in the pipeline in the direction in which deployment is intended, the method comprising connecting a strain gauge between the leading end of the cable to be deployed and a drogue so that when the drogue is inflated during deployment, the pulling force between the drogue and the cable will be detected by the strain gauge, inserting the drogue, the strain gauge and the leading end of the cable into the pipeline, and monitoring the strain gauge signal from the other end of the cable as the cable is being deployed while feeding the cable at or near the point of entry into the pipeline at a rate less than the flow rate of the fluid in the pipeline.

According to another aspect of the present invention there is provided apparatus for use in deploying a cable in a pipeline by the drag effect of a fluid flowing in the pipeline, comprising a casing housing a strain gauge, a drogue, means for coupling the drogue to the casing, means for coupling the casing to the leading end of the cable to be deployed, whereby the strain gauge will provide a signal in the cable dependent upon the pulling force of the drogue on the cable end caused by the flowing fluid, and means for monitoring the signal in the cable outside the pipeline.

According to a further aspect of the present invention there is provided a strain gauge device for coupling between a drogue and a cable end in the deployment of the cable in a pipeline using the drag effect of a fluid flowing in the pipeline in the direction of deployment, the device comprising a housing containing the strain gauge, a liquid-tight cable entry through the housing, a cable anchorage for anchoring the cable near the cable entry, and means for attaching the drogue to the casing whereby during deployment the pulling force of the drogue will be exerted on the casing such that the strain gauge will provide a signal in the cable dependent upon the pulling force.

In order that the invention can be clearly understood reference will now be made to the accompanying drawings in which:

BRIEF DESCRIPTION OF THE DRAWINGS

FIG. 1 shows in axial cross-section a strain gauge device for use in cable deployment and in accordance with an embodiment of the present invention;

FIG. 2 shows schematically the device of FIG. 1 in use in cable deployment in accordance with an embodiment of the invention.

FIG. 3 shows schematically initial insertion through the entry gland of FIG. 2.

DESCRIPTION OF PREFERRED EMBODIMENT

Figure 4:
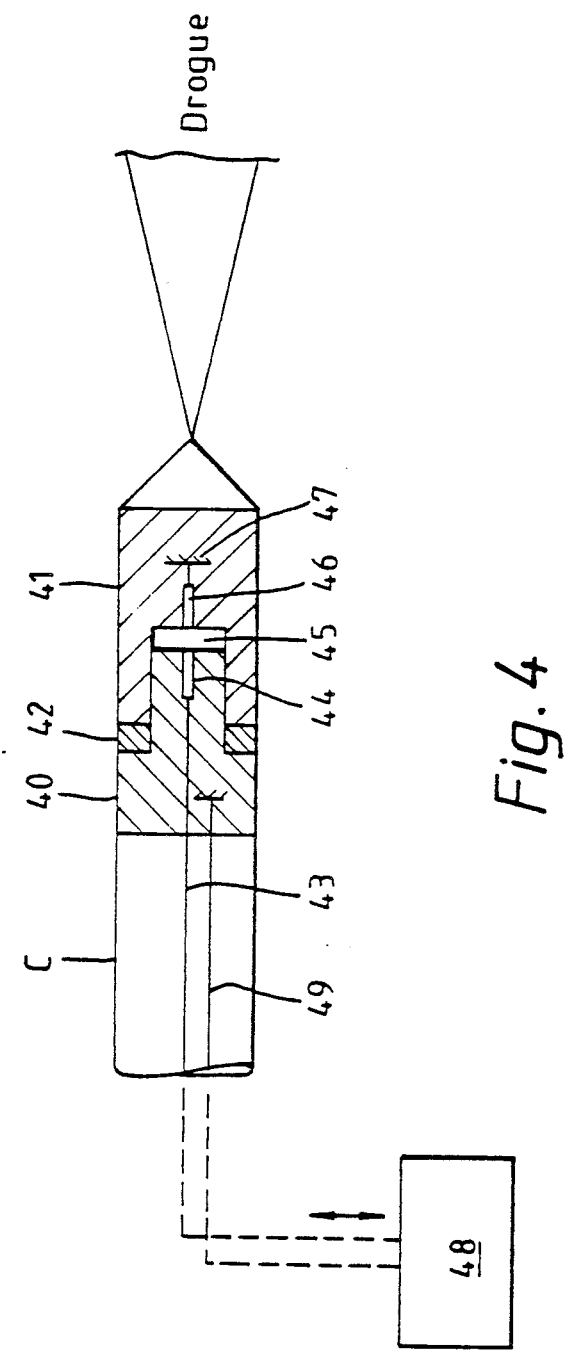
FIG. 4 shows schematically an optical version of the strain gauge of FIG. 1.

Referring to FIG. 1 the strain gauge device comprises a cable anchor ferrule 1 having a tapered clamp 2 locked to the strength member 22 of the cable C being deployed.

Anchor ferrule 1 is sealed to the cable sheath $C^1$ and fits in one end 3A of a first casing part 3, the entry being sealed by "0" rings 16 and locked by locking screw 18. Casing part 3 houses an amplifier 21 and fits at its other end 3B into a second casing part 4 housing the strain gauge elements 4A which are connected by leads 4B to amplifier 21. The casing parts are sealed to each other with "0" rings 15 and locked together by locking screw 17.

Casing 4 is closed by a two-part drogue plug 7A and 7B with a compression seal 12 between the parts and having a drogue connection shackle 8 screwed to a swivel shaft 6 which rotates on a thrust bearing 13.

The gauge elements 4A are secured to the inside of a thin-walled portion 4C of the casing part 4. Portion 4C obeys Hook's law so that extension of the thin wall caused by the pull of the drogue will be measured by the elements 4A which are connected in a bridge configuration, the out of balance signal of the bridge being amplified by amplifier 21. The amplified signal is passed via leads 21A connected to plug and socket 24 through wires 23 to the electrical conductors C" of cable C.

Thus the pull of the drogue is measured by the strain gauge device and the amplified signal is passed along the conductor C" of cable C to the other end so that the deployment of the cable can be monitored by monitoring the signal from the strain gauge device. Referring now to FIG. 2 and FIG. 3 as the drogue D in its collapsed state is introduced through the sidewall entry gland 30 followed by the strain gauge device 31 (as shown in FIG. 1) and then the leading end of the cable C there will be no signal from the strain gauge device ie. no pull from the drogue, until the drogue is inflated (see FIG. 3) by the flowing liquid L flowing in direction of intended deployment. When this happens a signal will suddenly appear on the monitor M of monitoring equipment 36 indicating that the drogue D has been inflated as shown in FIG. 3 and is now pulling the leading end of the cable in the direction of intended deployment.

The cable is pushed through the entry gland 30 by a motorised cable feeding device 32 so that a suitable pull, according to the drogue drag model in liquid filled pipelines, as measured by the strain gauge and visible on the monitor M is maintained as deployment proceeds. The feeding device 32 is controlled from the monitoring equipment 36 via link 38, to control the feed speed in dependence upon the monitored strain gauge signal. As shown in FIG. 1 a rotating swivel is used to remove twisting of the drogue strings. The strain gauge device measures the tension due to the drag of the drogue in the fluid flow. The strain gauge output is routed along the cable for monitoring at the cable entry point into the pipeline The cable is supplied from a supply drum 33 and slip rings 34 couple the signal from the cable via a link 35 with the monitoring equipment 36. D.C. feed is also sent via the link 35 and slip rings 34 to the cable D and the power is fed down the cable for excitation of the strain gauge elements and to power the amplifier 21. A cable length/velocity counter 37 is used at the cable entry point to measure the cable deployment speed and overall length at any time and provide a signal to the monitoring equipment via the connection lead "length-/velocity". A flow meter (not shown) to measure the instantaneous flow rate in the pipe can be used to calibrate the drag imposed by the drogue relative to the cable end. This is coupled to the connection lead marked "FLOW". A pressure gauge 41 may be used to cancel the pipeline pressure effects on the strain gauge if desired, providing a signal to the monitoring equipment via the connection lead marked "Pressure".

FIG. 2 shows a pipeline P which extends underground from point A to point B where it is recovered through a sidewall exit gland 40. As shown both locations have been exposed by digging holes in the ground.

When the cable is stationary in the flow, the drogue drag force is recorded by the strain gauge which has a relationship of:

$$\text{Drag} = CD \cdot 1 \cdot A \cdot V^2 \over 2 \quad (N)$$

Where:
CD=drag factor of drogue
1=density of pipe product (kg/m$^3$)
A=cross-sectional area of drogue (m$^2$)
V=effective flow velocity at drogue (m/S)

The effective flow velocity V is reduced if the cable is deployed in the direction of flow and increased if recovered against the direction of flow. Since drag is proportional to the square of velocity of flow, the system is most sensitive to slight cable speed variations from stationary. The drogue drag force tends towards zero for cable deployment speeds approaching the flow rate.

The effective flow velocity is greater at the drogue because of the reduction in the pipe free flow cross-sectional area caused by the drogue fabric area. This results in a dramatic increase in drogue tension as the drogue diameter approaches that of the pipeline internal bore. Large relative drogue sizes however can become unstable in the static cable condition and therefore induce large variations in recorded pull which appear as noise on the mean pull. This effect reduces as the cable speed approaches the flow rate. We prefer to use a drogue inflated diameter between $\frac{1}{2}$ and $\frac{3}{4}$ the internal diameter of the pipeline P.

Disturbances in flow due to pipeline construction such as in the region of severe bends, valves, T off's etc. result in drogue drag variations which can be detected in the strain gauge output. This additional information can be used to advantage in locating or confirming pipe features in conjunction with the cable-length-deployed counter.

The cable C is pushed through the sidewall entry gland 30 by a motorised cable feeding device 32 so that a suitable pull as measured by the strain gauge is maintained as deployment proceeds, as discussed above. The speed of entry of the cable through the gland must not be as fast as the liquid flow otherwise the drogue will collapse indicated by a loss of signal from the strain gauge. This is undesirable since the drogue also acts to guide the leading end of the cable along the pipeline, keeping it away from the sidewall and possible obstructions on the sidewall. More importantly the net flow along the cable will be zero resulting in cable stall due to zero drag.

Sudden loss of signal or a sharp drop in the signal can indicate that the drogue has collapsed or fouled an obstruction, in which case the cable feeding is immediately halted until the signal reappears indicating the drogue has inflated. A reduction in signal may indicate a change in the flow rate of the liquid in the pipeline and a slow drop in the signal can indicate the flow of liquid is dropping in which case the cable feed rate is changed accordingly in order to tend to maintain a desired pull from the drogue to ensure satisfactory deployment.

A rise in signal can indicate a cable stall condition between the cable entry point and the strain gauge termination resulting in the drogue becoming stationary in the flow, or a rise in flow rate at the drogue position. The former can be eliminated/confirmed by deliberately stopping cable deployment and checking the strain gauge response.

Deployment of the cable can result in laying of the cable from the point of entry A to the point of exit B, or it can be followed by laying of another cable attached to the deployed cable which is then used to pull the other cable back through the pipeline from point B to point A. The cable is attached to the strain gauge termination, having captured the drogue and extracted the termination at the exit point, and then using the leader cable to pull in the optic cable against normal flow. In this method the flow is not assisting in the deployment but the buoyancy assistance provided by the pipe liquid on both cables greatly reduces the frictional effects compared to dry duct pulling methods. The strain gauge is also used to monitor the cable link tension during the operation and cable feed is adjusted to maintain tension between an upper and lower limit. This method negates the need for accurate long term cable length measurement at both the input and output points of the pipeline.

Furthermore it would be possible to withdraw the deployed cable back through the sidewall entry gland if for example the cable were to be only temporarily deployed, or if damage to the drogue indicated by monitoring the strain gauge signal, had become impossible to rectify without recovering the cable as deployed so far.

The cable being deployed is near neutrally buoyant and the liquid filled pipeline is under pressure producing the liquid flow.

Although an electrical strain gauge has been illustrated in FIG. 1 it would also be possible to utilise a strain gauge providing an optical signal along an optical fibre in the cable C. To this end an alternative embodiment is shown schematically in FIG. 4 and operates on the basis of increasing the optical path length in dependence upon the pull of the drogue. The cable C is clamped to part 40 which is linked to part 41 by an extensible link 42. The optical fibre 43 of the cable C is coupled to an optical expanded beam termination 44, 46, and light passes against the gap 45 to an optical reflector 47 to reflect the signal back across the gap into the fibre 43. The optical loss across the gap increases with gap size which in turn increases as the pull from the drogue increases. By using reflectometer apparatus 48 to monitor the optical loss, the pull can be determined and the signal utilised in the same way as discussed earlier in respect of the electrical strain gauge. Care needs to be taken to ensure the cable has sufficient axial stiffness to not desensitize the strain gauge output through the effect of extension of the cable itself, or compensate for any cable extension effect. For example the cable extension effect could be compensated by use of a second fibre in the cable which has a silvered end at the rear of the strain gauge termination. The extensional (time delay increase) of this second fibre could then be subtracted from the primary fibre with the strain gauge attached, thus cancelling the cable extension component. The second fibre would preferably need to be directly adjacent to the primary fibre to ensure accurate cancellation. Static fibre length differences could be calibrated out with the strain gauge under zero tension.

In both electrical and optical embodiments, the flow rate of the liquid can be calibrated by stopping the cable at test intervals and measuring the static drag. The optical strain gauge technique means that an all optical cable can be laid without the need for a leader cable.

The electrical strain gauge described with reference to FIG. 1 is also pressure sensitive. This feature can be used to give additional positional information of head pressure along a pipeline route over hilly terrain. The aspect ratio of the thin walled tubular portion can be changed to increase or reduce the pressure sensitivity. Alternatively the design shown can be pressure compensated by using a vented tube or bladder-filled tube to equalise internal and external pressures of the strain gauge tube for eg. unknown pipe route topographies or extreme pressure variant routes.

We claim:

1. A method of deploying a cable in a pipeline utilising the drag of a fluid flowing in the pipeline in the direction in which deployment is intended to transport the cable along the pipeline, the method comprising connecting a strain gauge between the leading end of the cable to be deployed and a drogue so that when the drogue is inflated by the flowing fluid during deployment the pulling force between the drogue and the cable will be detected by the strain gauge, said force being a function of the fluid velocity relative to the cable, inserting the drogue, the strain gauge and the leading end of the cable into the pipeline and monitoring the strain gauge signal via the cable from the other end of the cable as the cable is being deployed while feeding the cable adjacent the point of entry at a rate less than the rate of flow of the fluid in the pipeline whereby to ensure correct deployment of the cable within the pipeline.

2. A method as claimed in claim 1, wherein the strain gauge device comprises an amplifier for amplifying the strain gauge signal.

3. A method as claimed in claim 2 wherein the amplifier is powered by power transmitted along the cable being deployed.

4. An apparatus for use in deploying a cable in a pipeline by the drag effect of a flowing fluid in the pipeline, the apparatus comprising a casing incorporating a strain gauge, a drogue, means for coupling the drogue to the casing, means for coupling the casing to the leading end of the cable to be deployed, whereby the strain gauge will provide a signal in the cable dependent upon the pulling force of the drogue on the cable end caused by the flowing liquid, said force being a function of the fluid velocity relative to the cable, means for monitoring the strain gauge signal in the cable outside the pipeline, and means for feeding the cable into the pipeline at a rate determined from said strain gauge signal whereby to ensure correct deployment of the cable within the pipeline.

5. An apparatus as claimed in claim 4 comprising an anchor ferrule for anchoring to the cable and a seal for sealing the ferrule through a cable entry into the casing of the strain gauge device.

6. An apparatus as claimed in claim 5, wherein the strain gauge device comprises a casing portion having a thin annular wall on which are secured strain gauge elements, said wall extending and contracting in dependence upon the pull of the drogue.

7. An apparatus as claimed in claim 6, wherein said strain gauge has a vented oil or bladder-filled tube to compensate for external pressure effects on the strain gauge.

* * * * *